(12) United States Patent
Hilliar (10) Patent No.: US 10,044,716 B2
(45) Date of Patent: Aug. 7, 2018

(54) AUTHORIZING ACCESS TO AN APPLICATION LIBRARY

(71) Applicant: Visa International Service Association, San Francisco, CA (US)

(72) Inventor: Paul Hilliar, Bristol (GB)

(73) Assignee: Visa International Service Association, San Francisco, CA (US)

( * ) Notice: Subject to any disclaimer, the term of this patent is extended or adjusted under 35 U.S.C. 154(b) by 67 days.

(21) Appl. No.: 14/982,869

(22) Filed: Dec. 29, 2015

(65) Prior Publication Data

US 2016/0219055 A1    Jul. 28, 2016

Related U.S. Application Data

(60) Provisional application No. 62/097,267, filed on Dec. 29, 2014.

(51) Int. Cl.
*G06F 7/04* (2006.01)
*H04L 29/06* (2006.01)
(Continued)

(52) U.S. Cl.
CPC ............ *H04L 63/10* (2013.01); *H04L 9/0816* (2013.01); *H04L 9/3228* (2013.01);
(Continued)

(58) Field of Classification Search
CPC ...... H04L 63/10; H04L 63/0428; H04L 63/06
(Continued)

(56) References Cited

U.S. PATENT DOCUMENTS 5,848,145 A * 12/1998 Gallagher ............... H04L 45/10
370/255
6,862,683 B1    3/2005 Wille et al.
(Continued)

FOREIGN PATENT DOCUMENTS

WO    WO 2009145774 A1    12/2009

OTHER PUBLICATIONS

Ogundele et al., "The implementation of a full EMV smartcard for a point-of-sale transaction," World Congress on Internet Security ( WorldCIS-2012) Year: 2012 pp. 28-35.*
(Continued)

*Primary Examiner* — Roderick Tolentino
(74) *Attorney, Agent, or Firm* — Kilpatrick Townsend & Stockton LLP (57) ABSTRACT

To prevent malicious code from accessing security sensitive functions implemented in a private portion of an application, accesses to the private portion are performed using a secure session established within the application between the private portion and a public portion of the same application. An authorization key can be shared between the public portion and the private portion. When the public portion attempts to invoke a function implemented in the private portion, a secure session is set up by generating a session ID, combining the session ID and the authorization key in a key derivation function to generate a conversation key, and using the conversation key to encrypt the function call from the public portion. The private portion can then decrypt a properly encrypted function call and invoke the appropriate function.

17 Claims, 7 Drawing Sheets

(51) Int. Cl.
*H04L 9/08* (2006.01)
*H04L 9/32* (2006.01)

(52) U.S. Cl.
CPC .......... *H04L 63/0428* (2013.01); *H04L 63/06* (2013.01); *H04L 2209/80* (2013.01)

(58) Field of Classification Search
USPC ....................................................... 726/2–10
See application file for complete search history.

(56) References Cited

U.S. PATENT DOCUMENTS

| | | | |
|---|---|---|---|
| 7,162,711 B2 | 1/2007 | Czajkowski et al. | |
| 8,196,213 B2 | 6/2012 | Klucher et al. | |
| 8,683,462 B2 | 3/2014 | Goldman | |
| 8,863,126 B2 | 10/2014 | Poore et al. | |
| 9,270,449 B1* | 2/2016 | Tribble | H04L 63/0435 |
| 2003/0005118 A1* | 1/2003 | Williams | H04L 63/08 709/225 |
| 2004/0229595 A1* | 11/2004 | Laursen | G06F 21/41 455/403 |
| 2005/0086376 A1* | 4/2005 | Park | H04L 67/24 709/245 |
| 2006/0288215 A1 | 12/2006 | Takemura et al. | |
| 2007/0033403 A1 | 2/2007 | Lauter et al. | |
| 2008/0201577 A1* | 8/2008 | Tuliani | G06F 21/34 713/168 |
| 2012/0047494 A1* | 2/2012 | Unrein | G06F 9/44521 717/137 |
| 2013/0067016 A1 | 3/2013 | Adkins et al. | |
| 2014/0181508 A1* | 6/2014 | Tanizawa | H04L 63/0428 713/162 |
| 2014/0310182 A1* | 10/2014 | Cummins | G06Q 20/4012 705/71 |
| 2015/0106900 A1* | 4/2015 | Pinski | H04L 63/0876 726/7 |

OTHER PUBLICATIONS

Urien et al., "A breakthrough for prepaid payment: End to end token exchange and management using secure SSL channels created by EAP-TL," 2011 International Conference on Collaboration Technologies and Systems (CTS) Year: 2011 pp. 476-483.*
International Search Report and Written Opinion in PCT/IB2015/060038, 12 pages.

* cited by examiner

AUTHORIZING ACCESS TO AN APPLICATION LIBRARY

CROSS-REFERENCES TO RELATED APPLICATIONS

The present application is a non-provisional application of and claims priority to U.S. Provisional Application No. 62/097,267, filed on Dec. 29, 2014, the entire contents of which is hereby incorporated by reference for all purposes.

BACKGROUND

One way hackers can exploit a software application is to embed malicious code into the application. If the application has access to security sensitive information such as account credentials, the malicious code can invoke a function in the application to gain access to the sensitive information. The malicious code can then implement a relay attack by sending the sensitive information to an unauthorized remote site.

Embodiments of the invention address this and other problems, individually and collectively.

BRIEF SUMMARY

Embodiments of the present invention provide techniques for enhancing the security of a computing device (e.g., a portable communication device), and in particular, for enhancing the security of an application installed on a computing device. In some embodiments, an application can be partitioned into a public portion and a private portion. The private portion can be a native library that is used to implement security sensitive functions (e.g., functions such as token request, account parameters replenishment, etc.). The public portion can be a set of public application program interfaces (APIs) that is used to implement non-security sensitive functions (e.g., user interface related functions, networking functions, etc.), and functions that invoke the security sensitive functions of the private portion. To prevent malicious code from accessing the security sensitive functions implemented in the private portion of the application, accesses to the private portion are performed using a secure session established within the application between the public portion and the private portion. An authorization key can be shared between the public portion and the private portion. When the public portion attempts to invoke a function implemented in the private portion, a secure session is set up by generating a session ID, combining the session ID and the authorization key in a key derivation function to generate a conversation key, and using the conversation key to encrypt the function call from the public portion. The private portion can then decrypt a properly encrypted function call and invoke the appropriate function.

In some embodiments, a portable communication device may include one or more processors, and a memory coupled to the one or more processors and storing computer readable code, which when executed by the one or more processors, implements an application having a public portion and a private portion. The public portion can be configured to send a start session request to the private portion, receive a session identifier (ID) from the private portion, and generate a conversation key using the session ID and a key derivation function. The public portion can also be configured to encrypt a payload of a function invocation request using the conversation key, where the payload represents a function call of a function implemented in the private portion, and to send the function invocation request including the encrypted payload to the private portion. The private portion can be configured to execute the function being called in the function invocation request.

In some embodiments, a process for controlling access in an application having a public portion and a private portion may include sending, by the public portion of the application, a start session request to the private portion of the application, and receiving, by the public portion, a session identifier (ID) from the private portion. The public portion may generate a conversation key using the session ID and a key derivation function, and encrypt a payload of a function invocation request using the conversation key in which the payload represents a function call of a function implemented in the private portion. The public portion may then send the function invocation request including the encrypted payload to the private portion to invoke the function.

In some embodiments, a process for controlling access in an application having a public portion and a private portion may include receiving, by the private portion of the application, a start session request from a public portion of the application; and generating, by the private portion, a session ID in response to the start session request. The private portion may sending the session ID to the public portion, and generate a conversation key using the session ID and a key derivation function. The private portion may receiving, from the public portion, a function invocation request including an encrypted payload representing a function call of a function implemented in the private portion. The private portion may decrypt the encrypted payload using the conversation key to retrieve the function call, and execute the function of the function call.

DETAILED DESCRIPTION

Embodiments of the present invention provide techniques for enhancing the security of a computing device (e.g., a portable communication device), and in particular, for enhancing the security of an application installed on a computing device. In some embodiments, an application can be partitioned into a public portion and a private portion. The private portion can be a native library that is used to implement security sensitive functions (e.g., functions such as token request, account parameters replenishment, etc.). The public portion can be a set of public application program interfaces (APIs) that is used to implement non-security sensitive functions (e.g., user interface related functions, networking functions, etc.), and functions that invoke the security sensitive functions of the private portion.

According to some embodiments, to prevent malicious code from accessing the security sensitive functions implemented in the private portion of the application, accesses to the private portion are performed using a secure session established within the application between the public portion and the private portion. An authorization key can be shared between the public portion and the private portion. When the public portion attempts to invoke a function implemented in the private portion, a secure session is set up by generating a session ID, combining the session ID and the authorization key in a key derivation function to generate a conversation key, and using the conversation key to encrypt the function call from the public portion. The private portion can then decrypt a properly encrypted function call and invoke the appropriate function. Malicious code that attempts to access a function in the private portion is unlikely to have a valid authorization key to generate a valid conversation key to properly encrypt the function call. As a result, the private portion would not recognize the function call and would ignore such access attempts by malicious code.

Prior to discussing the details of some embodiments of the present invention, description of some terms may be helpful in understanding the various embodiments.

A "communication device" may be a device that includes one or more electronic components (e.g., an integrated chip) that can communicate with another device. For example, a communication device can be a computing device that includes at least one processor coupled to a memory that stores instructions or code for execution by the processor. A "portable communication device" may be a communication device that can be transported and operated by a user, and may include one or more electronic components (e.g., an integrated chip). A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable device (e.g., watch, health monitoring device such as a fitness tracker, etc.), electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or transaction processing network, and for interacting with a transaction device (e.g., a payment device), a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a transaction processing network and/or an issuer of a transaction card (e.g., a payment card). An authorization request message according to some embodiments may comply with ISO 8583, which is a standard for systems that exchange electronic transaction information associated with a transaction made by a user using a transaction device or transaction account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a transaction processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network) to the merchant computer that indicates approval of the transaction. The code may serve as proof of authorization. As noted above, in some embodiments, a transaction processing network may generate or forward the authorization response message to the merchant.

A "token" may include a substitute identifier for some information. For example, a transaction token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with an account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "limited-use key" or "LUK" may refer to a key that can be used for only a limited time or a limited number of transactions, and may need to be renewed or replenished when the limited usage has been exhausted. The LUK may be associated with a set of one or more limited-use thresholds that limits the usage of the LUK, where once the usage of the LUK has exhausted or exceeded the set of one or more limited-use thresholds, a further transaction conducted using that LUK will be declined even if the underlying account is still in good standing. The set of one or more limited-use thresholds may include at least one of a number of transactions that the LUK can be used for, a time-to-live indicating the duration of time for which the LUK is valid, and/or a cumulative transaction amount indicating the total transaction amount summed across one or more transactions for which the LUK is valid, or any combination thereof.

A limited-use threshold may refer to a condition that limits the usage of a piece of information. A limited-use threshold may be exceeded or exhausted when the underlying condition is met. For example, a limited-use threshold may include a time-to-live that indicates an amount of time that a piece of information is valid for, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

A "transaction processing network" may include a network that can process and route transaction request messages. An exemplary transaction processing network may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Details of some embodiments of the present invention will now be described.

Figure 1:
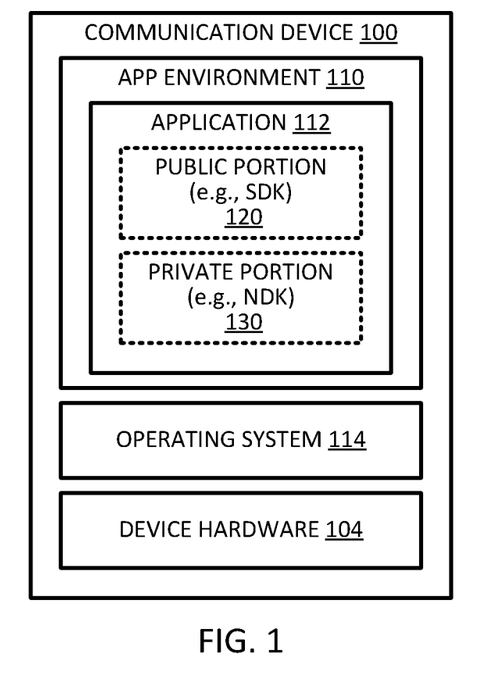
FIG. 1 illustrates a block diagram of a communication device, according to some embodiments.

FIG. 1 illustrates a communication device 100, according to some embodiments. Communication device 100 can be a computing device, and in some implementations, can be a portable communication device such as a mobile device. Communication device 100 may include device hardware 104 such as one or more processors, an operating system 114, and an application 112 running on communication device 100. In some embodiments, application 122 can be executing within an application environment 110 such as a virtual machine 110.

Application 112 may be partitioned into multiple portions (e.g., multiple software layers or software libraries). For example, application 122 may include a public portion 120 as a first software layer, and a private portion 130 as a second software layer. Public portion 120 and private portion 130 can be provided by the same developer or be provided by different entities. In some embodiments, public portion 120 and private portion 130 can be written in the same or different programming languages. For example, public portion 120 can be written in a high level programming language, and can be implemented as a software development kit (SDK). Private portion 130 can be a native library such as a native development kit (NDK), and can be written in a low level programming language. In some embodiments, private portion 130 can be a native library that can be shared amongst various applications executing in application environment 110. Public portion 120 can communicate with private portion 130 to exchange data and invoke functions implemented in private portion 130, and/or vice versa, via an interface between the two software layers.

In some embodiments, operating system 114 can be a mobile operating system such as Android. Public portion 120 can be written in Java, and private portion 130 can be written in a C or C++. In such embodiments, the interface between public portion 120 and private portion 130 can be a Java Native Interface (JNI). During compilation of application 112, the Java public portion 120 source code can be compiled using a Java complier such as Javac into Java class files. The C or C++ code headers which allow public portion 120 to call functions in private portion 130 can be generated by a header file generator such as Javah. The native C or C++ private portion 130 source code can be compiled and linked to the header files to form a shared object (.so) dynamic library file. The Java class files and the dynamic library file can be packaged and compressed into an application package file (e.g., an Android application package (.apk) file). This application package file can be downloaded from an application store onto communication device 100, and is used to install application 112 onto communication device 100. In some embodiments, installing application 112 will instantiate a virtual machine instance such as a Dalvik virtual machine instance in which application 112 will run.

In some embodiments, application 112 can be an application that has access to and uses or processes sensitive information. For example, application 112 may use certain sensitive data assets such as encryption keys to perform cryptographic operations, or may access or use sensitive information such as personal or financial information. Functions related to the processing of sensitive information (may be referred to as security-sensitive functions) can be implemented in the private portion 130, whereas basic functions such as user interface and external communication (e.g., networking) functionalities can be implemented in public portion 120. Due to the modularized nature of application 112, without proper safeguards, the private portion 130 implementing the security-sensitive functions can be susceptible to hacking attempts that seek to comprise the underlying sensitive information.

It should also be noted that public portion 120 and private portion 130 are part of one application 112. Thus, for example, application 112 including public portion 120 and private portion 130 can be downloaded initially from an application store as a single application package, and installed on communication device 100 as a single application. Application 112 including public portion 120 and private portion 130 can be represented as one icon on a user interface of communication device 100, and application 112 including public portion 120 and private portion 130 is treated by operating system 114 as one application.

Figure 2:
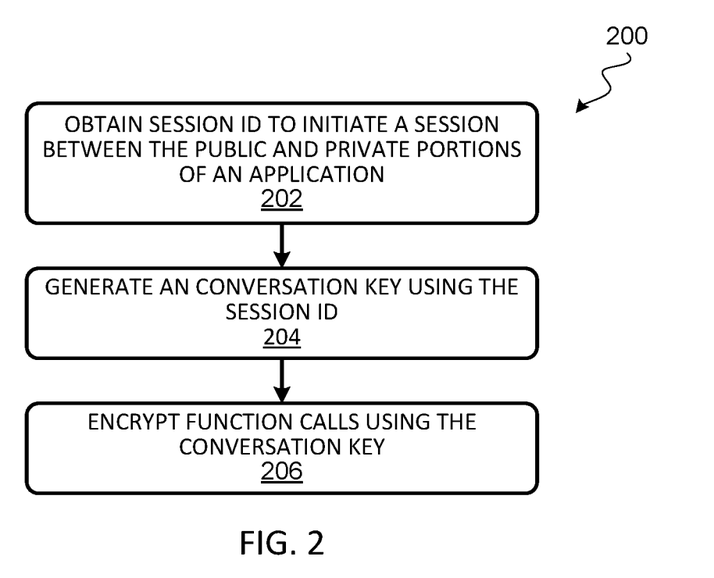
FIG. 2 illustrates a flow diagram of a process for controlling access to a function in an application, according to some embodiments.

FIG. 2 illustrates a flow diagram of a process 200 for controlling access to functions implemented in an application having multiple layers or portions, according to some embodiments. For example, process 200 can be used to control access to security-sensitive functions implemented in a private portion of the application. At block 202, the invoking layer (e.g., public portion) of the application attempting to access a function implemented in a target layer (e.g., a private portion) of the application may obtaining a session identifier (ID) to initiate a session between the two layers of the application. The session ID can be generated by the target layer of the application, or by another layer of the application, another application, or another entity (e.g., the operating system).

At block 204, a conversation key can be generated using the session ID. For example, in some embodiments, the session ID can be encrypted to generate the conversation key. In some embodiments, the session ID can be used as an input seed (e.g., a salt value) to a key derivation algorithm to generate the conversation key. Both the invoking layer and the target layer of the application may individually generate the conversation key based on the session ID. The conversation key can be a symmetric key that is used to both encrypt and decrypt data.

At block 206, when the invoking layer wants to invoke a function implemented in the target layer of the application, the invoking layer can encrypt the function call using the conversation key. The target layer, having generated the conversation key based on the same session ID, can properly decrypt the function call using its own copy of the conversation key. The target layer may then proceed to execute the function being called.

In some embodiments, the target layer can be configured to ignore any incoming requests except for start session requests (to request a session ID) and function invocation requests. Thus, function calls to the target layer are received in the encrypted payload of the function invocation requests. Function calls that are not encrypted with the proper conversation key, or function calls that are not received as the payload of a function invocation request can be ignored by the target layer.

Figure 3:
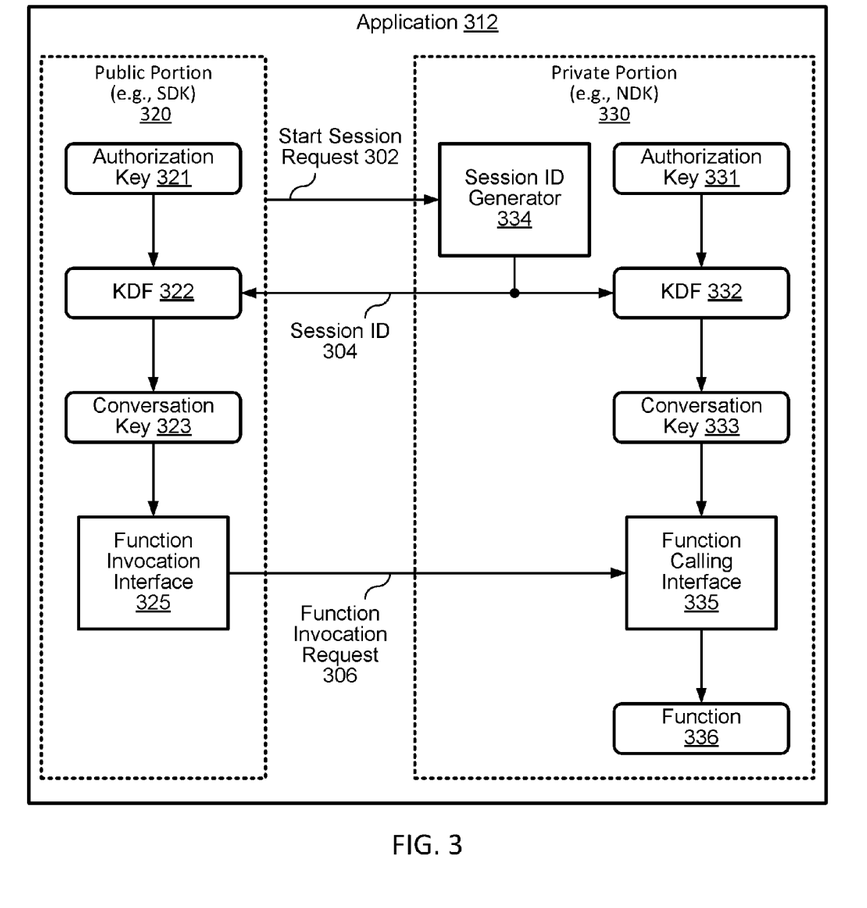
FIG. 3 illustrates a conceptual block diagram of an application, according to some embodiments.

FIG. 3 illustrates a block diagram of some components of a mobile application 312, according to some embodiments. Mobile application 312 may include a public portion 320 (e.g., a software development kit SDK) and a private portion 330 (e.g., a native library NDK). Public portion 320 can be written in a first programming language such as Java, and private portion 330 can be written in a second programming language such as C or C++. At build time, a unique encryption key is generated and shared between public portion 320 and private portion 330. The unique encryption key can be, for example, a 128-bit key, 256-bit key, or a key of other lengths, and can be a random or pseudo random number. This unique encryption key can be embedded into public portion 320 as authorization key 321, and embedded into private portion 330 as authorization key 331.

Public portion 320 may include a key derivation function (KDF) 322 that is used by public portion 320 to generate a conversation key 323 during runtime. Public portion 320 may also include a function invocation interface 325 that is used by public portion 320 to invoke a function implemented in private portion 330.

Private portion 330 may include a session ID generator 334 that generates a session ID 304 to establish a session between public portion 320 and private portion 330. Private portion 330 may also include a key derivation function (KDF) 332 corresponding to KDF 322. KDF 332 is used by private portion 330 to generate a corresponding conversation key 333 for private portion 330 during runtime. Private portion 330 may also include a function calling interface 335 that calls a function 336 implemented in private portion 330 for public portion 320.

When pubic portion 320 is initialized or when function 336 implemented in private portion 330 is needed by public portion 320, public portion 320 may send a start session request 302 to private portion 330 (e.g., to session ID generator 334 of private portion 330). In some embodiments, public portion 320 may send start session request 302 each time application 312 is launched or started, each time application 312 is selected or brought to the foreground of a user interface, and/or each time application 312 is used to initiate or perform a particular operation. In response to receiving start session request 302, session ID generator 334 can generate a session ID 304. In some embodiments, session ID generator 334 can be a random number generator that generates a random number as session ID 304, a pseudo-random number generator that generates a pseudo-random number as session ID 304, a counter that generates a counter value as session ID 334, or a sequence or pattern generator that generates session ID 304 according to a particular sequence or pattern. Although session ID generator 334 is shown as part of private portion 330, in some embodiments, session ID generator 334 can be part of a different portion of application 312, part of another application, or part of another component of the communication device (e.g., operating system).

After session ID 334 has been generated by session ID generator 334, session ID 334 is provided to key derivation function (KDF) 322 of public portion 320 and to key derivation function (KDF) 332 of private portion 330. KDF 332 of private portion 330 combines session ID 304 with authorization key 331 to generate conversation key 333. For example, KDF 332 can be a mathematical (e.g., addition, multiplication, etc.) or logical (e.g., XOR, XNOR, etc.) operation that takes session ID 304 and authorization key 331 as operands to generate conversation key 333. As another example, KDF 332 can be a hash algorithm that is computed over authorization key 321 as the input data, and session ID 304 can be used as a salt value for the hash algorithm (or vice versa) to generate conversation key 333. As a further example, KDF 332 can be an encryption algorithm that encrypts session ID 304 using authorization key 331 as the encryption key (or vice versa) to generate conversation key 333. In some embodiments, KDF 332 can be a combination of one or more mathematical or logical operations, hash algorithm, and/or encryption algorithm. For example, KDF 332 can be an encryption algorithm that is applied to the result of applying a logical operation to session ID 304 and authorization key 331.

KDF 322 of public portion 320 employs the same algorithm(s) and/or operation(s) as KDF 332 of private portion 330. Upon receiving session ID 304 from session ID generator 334, public portion 320 uses KDF 322 to combine authorization key 321 with session ID 304 to derive conversation key 323. In some embodiments, KDF 322 used by the public portion 320 can be provided to pubic portion 320 by private portion 330 when private portion 330 responds to start session request 302.

In some embodiments, KDFs 322 and 332 can be dynamic and may change from one session to another. For example, for each new session, KDF 332 can be derived as a variant of a base key derivation function by applying a dynamic seed to the base key derivation function. The dynamic seed can be, for example, a session counter that counts the number of prior sessions that have been established between public portion 320 and private portion 330. In some embodiments, private portion 330 may include a set of key derivation functions, and KDF 332 used for a particular session can be selected from the set of key derivation functions (e.g., by rotating the KDFs each time a new session is established between public portion 320 and private portion 330). KDF 322 used by public portion 320 can be derived in the same manner. In some embodiments, if public portion 320 contains a set of key derivation functions to select from, KDF 322 can be selected by private portion 330 based on the particular KDF 332 used by private portion 330 for the particular session.

To invoke a function implemented in private portion 330, public portion 320 provides the generated conversation key 323 to function invocation interface 325. Function invocation interface 325 may encrypt the function call of the function being invoked and its associated parameters using conversation key 323, and packages the encrypted information as the payload of function invocation request 306. Public portion 320 then sends function invocation request 306 with the encrypted payload to function calling interface 335 of private portion 330. When private portion 330 receives function invocation request 306, function calling interface 335 decrypts the payload of function invocation request 306 to retrieve the function call and its associated parameters. Upon properly decrypting the function call, the corresponding function 336 is identified, and private portion 330 performs the underlying function 336 of function invocation request 306. In some embodiments, if function 336 involves returning data or information to public portion 320 from private portion 330, the return data or information can be encrypted by conversation key 333 before being sent to public portion 320. Public portion 320 can decrypt the encrypted return data and information using conversion key 323.

In some embodiments, after a predetermined time period and/or a certain number of function calls, private portion 330 may terminate the current session, and force public portion 320 to negotiate a new session ID and derive a new conversation key for any further function calls from public portion 320. For example, a session established between public portion 320 and private portion 330 may terminate after 2 minutes, 5 minutes, or 10 minutes, etc. has elapsed since the generation of the corresponding session ID, or after 1 minute, 2 minutes, 5 minutes, or 10 minutes, etc. after application 312 has been idle. As another example, a session established between public portion 320 and private portion 330 may terminate after private portion receives 1, 2, or 5 function invocation requests from public portion 320. In some embodiments, the predetermined time period or number of function calls can be configurable by the application provider or by the user.

As described above, only two types of communications are needed from public portion 320 of application 312 to invoke any function that is implemented in private portion 330—a start session request 302 and a function invocation request 306. As such, in some embodiments, to further protect private portion 330 from being accessed by malicious code, private portion 330 can be configured to ignore communications or requests from public portion 320 which are neither a start session request nor a function invocation request.

In some embodiments, application 312 may include a native interface (not shown) such as a Java Native Interface (JNI) that interfaces between public portion 320 and private portion 330. Some or all of the functionalities performed by the private portion 330 described herein for establishing the session with public portion 320 can be implemented in the native interface.

Figure 4:
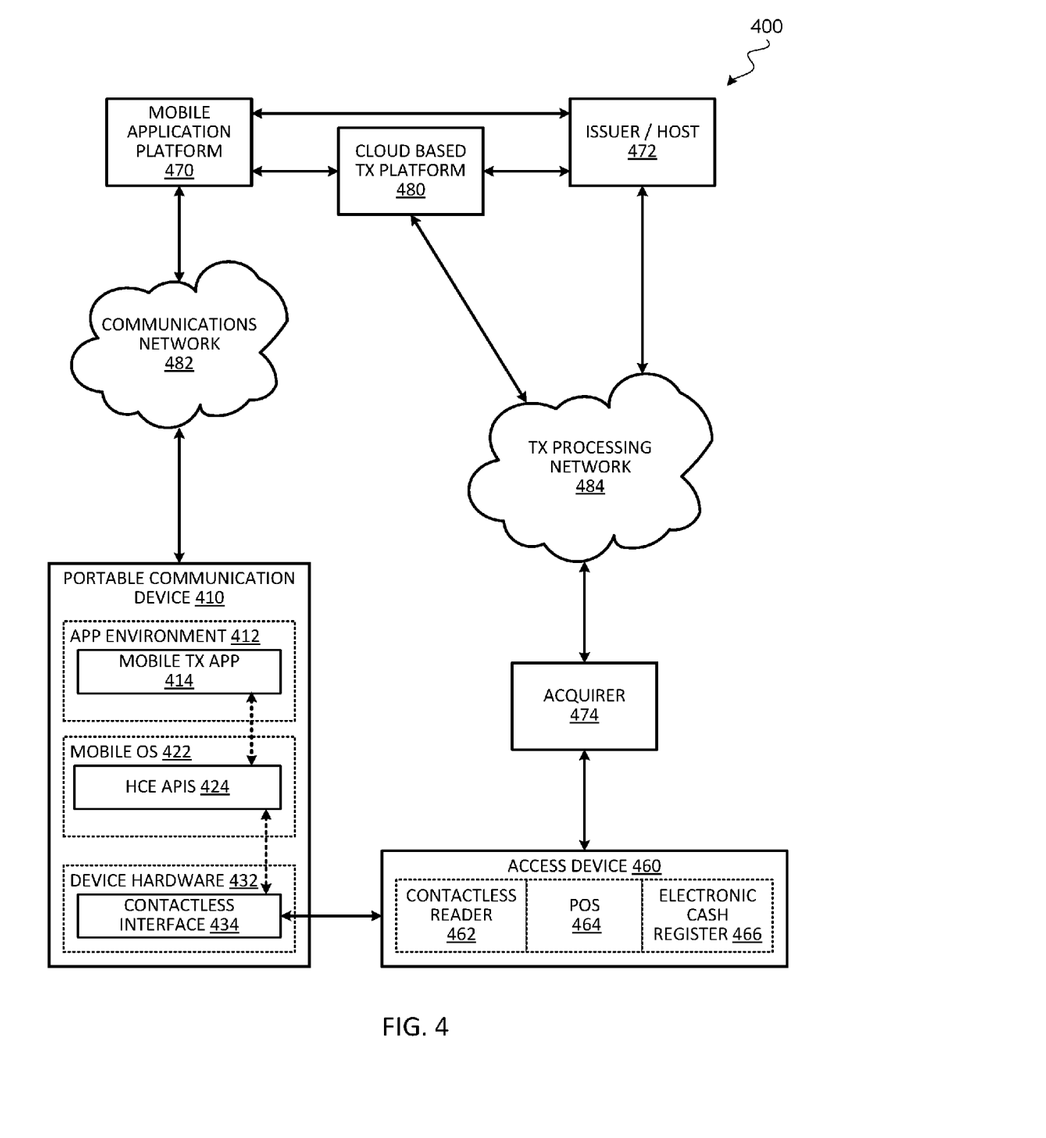
FIG. 4 illustrates a block diagram of a system, according to some embodiments.

FIG. 4 illustrates a block diagram of an exemplary system 500 in which the access control techniques described herein can be used, according to some embodiments. System 400 can be, for example, a cloud-based transaction system for conducting cloud-based transactions. System 400 includes a portable communication device 410 (e.g., a mobile device), a cloud-based transaction platform (CBP) 480, and a mobile application platform (MAP) 470. CBP 480 may be implemented using one or more computing devices, and can be associated with or operated by an issuer, transaction processor, and/or other suitable entities. CBP 480 implements a set of functionalities including account management, and account parameters generation and replenishment to enable could-based transactions to be conducted via portable communication device 410.

MAP 470 is used to facilitate communications between CBP 480 and mobile application 514 (e.g., a transaction application) in portable communication device 410. MAP 470 may be implemented using one or more computing devices, and can be associated with or operated by the service provider of mobile application 414 (e.g., mobile software application), such as an issuer, a mobile wallet provider, a merchant, and/or other suitable entities. In some embodiments, MAP 470 can be associated with or operated by the same entity as CBP 480, or they can be separate. MAP 470 is used to intermediate requests between the mobile application 414 and CBP 480, and to ensure that requests and responses initiated by either party are fulfilled once connectivity to portable communication device 410 is established, for example, via a communications network 482 (e.g., internet, mobile or cellular network, etc.). It should be understood that in some embodiments, one or more functionalities of CBP 480, MAP 470, and/or issuer or host processing system 472, may be integrated into the same computing system or different computing systems.

Portable communication device 410 can be used to conduct cloud-based transactions (e.g., payment transactions) facilitated by CBP 480 and/or MAP 470. Portable communication device 410 includes device hardware 432, mobile operating system (OS) 422, and applications environment 412. Device hardware 432 includes a contactless interface 434 that can contactlessly communicate or otherwise present information to another device such as a contactless reader 462 of an access device 460. Examples of contactless interface 434 can include a near-field communications (NFC) interface that can send and receive communications using radio frequency, or other wireless communication protocols such as Bluetooth, Bluetooth Low Energy (BLE), Wi-Fi, etc. Examples of contactless interface 534 may also include an optical interface such as a display to present information such as quick response (QR) codes, bar codes, etc.

Applications environment 412 of portable communication device 410 may include a mobile application 414 such as a transaction application provided by a service provider. For example, if the service provider of mobile application 414 is an issuer, mobile application 414 may be a mobile banking application or a mobile payment application. If the service provider is a mobile wallet provider such as a mobile network operator or third-party wallet provider that supports multiple issuers, mobile application 414 may be a mobile wallet application. For merchants, mobile application 414 may be a merchant's own transaction application from which consumers can conduct e-commerce or point of sale transactions, or a mobile wallet application supporting multiple merchants.

In some embodiments, mobile application 414 may include on-device cloud-based transaction logic integrated into mobile application 414 to support cloud-based transactions. The on-device cloud-based transaction logic performs functions to facilitate cloud-based transactions such as to take account parameters provided for use in payment transactions and deliver them to mobile operating system 422 for transmission over contactless interface 434. For example, the on-device cloud-based transaction logic may use a cryptogram key (e.g., a limited-use key) provisioned from CBP 480 to generate a transaction cryptogram that is transmitted over contactless interface to access device 460 to conduct a payment transaction. The transaction cryptogram can be sent over to the transaction processing network 484 to obtain authorization for the payment transaction. The on-device cloud-based transaction logic also manages the initial service profile parameters that are provided after an account has been provisioned to ensure that requests for account parameter replenishment and other account parameter management activities are initiated.

To provision portable communication device 410 for cloud-based payment transactions, CBP 480 can be used to configure account portfolios associated with issuers and to provide portable communication device 410 with account parameters for use when conducting cloud-based transactions. The account portfolios established by CBP 480 can include characteristics such as risk parameters (e.g., velocity controls) that manages the triggers of when account parameters on a provisioned device will need to be refreshed for accounts in each portfolio. To ensure consistent performance and usability, a set of minimum parameters configurable in a service profile can be implemented by CBP 480. To ensure that cloud-based payment transactions are processed according to the rules specified in the service profile for an account portfolio, CBP 480 performs various core functions during the lifetime of an account that has been enabled. These functions can include provisioning, active account management, verification for payment, transaction processing, lifecycle management and post-payment.

CBP 480 may create a service profile for a portfolio before an account is provisioned as a cloud-based transaction account. Provisioning may include taking an enrolled account, create account information such as an alternate account identifier (e.g., alternate Primary Account Number (PAN)) or a token acting as an account identifier substitute that can be used instead of a real account identifier (e.g., a real PAN) to conduct transactions, and inheriting service profile has been established for the portfolio. Once an account is provisioned, the relevant service profile details are shared with both the transaction processing and the on-device cloud-based transaction logic to ensure that decision making can be done at transaction processing and during mobile application usage by the user.

Once an account is provisioned, active account management can be performed by CBP 480. Active account management can be initiated either from transaction processing activity or from mobile application activity. After the account has been provisioned, the active account management capability generates the initial set of account parameters to be deployed to portable communication device 410. The account parameters may include account information generated during provisioning (e.g., alternate account identifier or token), as well as dynamic information to ensure the set of account parameters have only a limited use or limited lifespan once delivered to the device. Dynamic information may include limited-use cryptogram keys or dynamic data depending on what type of transaction is being supported. For example, the dynamic information may include limited-use keys (LUK) to calculate cryptograms, as well as limited use dynamic data to support legacy dynamic card verification value or code based implementations.

During transaction processing, if the service profile parameters maintained by CBP 480 for a particular account indicate that account parameters on portable communication device 410 need to be replaced, the active account management capability of CBP 480 may connect to portable communication device 410 via MAP 470 to replenish account parameters. Likewise, if the on-device service profile parameters stored on portable communication device 410 indicate that account parameter replenishment is needed or is close to be being needed (i.e., by monitoring account parameter thresholds), then mobile application 414 can make a request to CBP 480 for account parameter replenishment.

Once portable communication device 410 has been provisioned to conduct cloud-based transactions, transactions can be conducted via portable communication device 410 by interacting with a contactless reader 462 of an access device 460 (e.g., at a merchant location). Components of access device 460 may include point-of-sale (POS) terminal 464 and/or electronic cash register 466. Access device 460 can be coupled to acquirer 474 (e.g., via a merchant computer not shown). Acquirer 474 may be connected to an issuer or host processing system 472 via transaction processing network 484. Transaction processing network 484 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. Transaction processing network 584 may use any suitable wired or wireless network, including the Internet.

Transaction processing network 584 may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Each of the entities (e.g., acquirer 474, transaction processing network 484, issuer or host processing system 472) may include one or more computers to enable communications, or to perform one or more of the functions described herein.

To conduct a cloud-based transaction, a user of portable communication device 410 may tap portable communication device 410 against contactless reader 462 (e.g., via NFC) of access device 460, or display an image such as a bar code or QR code on a screen of portable communication device 410 that can be scanned by contactless reader 462 (e.g., an optical scanner or reader) of access device 460. In some embodiments, portable communication device 410 may provide access device 460 with an account identifier (e.g., an alternate account identifier, a token, etc.) and additional information such as limited-use account parameters or information derived from the limited-use account parameters. For example, an account identifier or token, and/or additional information (e.g., transaction cryptogram) can be encoded in a bar code or QR code that is scanned by access device 460; or the account identifier or token, and/or additional information can be transmitted to access device 460 via NFC. In some embodiments, the limited-use account parameters may include a transaction cryptogram.

Access device 460 or a merchant computer coupled to access device 460 may generate an authorization request message including the account identifier and additional information (e.g., limited-use account parameters, or information derived from the limited-use account parameters), and forward the authorization request message to acquirer 474. The authorization request message is then sent to transaction processing network 484. Transaction processing network 484 then forwards the authorization request message to the corresponding issuer or host processing system 472 associated with an issuer of the account associated with portable communication device 410.

After issuer or host processing system 472 receives the authorization request message, the authorization request message may be parsed, and information in the authorization request message may be sent to CBP 480 for verification. An authorization response message is then sent back to transaction processing network 484 to indicate whether the current transaction is authorized (or not authorized). Transaction processing network 484 then forwards the authorization response message back to acquirer 474. In some embodiments, transaction processing network 484 may decline the transaction even if issuer or host processing system 472 has authorized the transaction, for example depending on a value of a fraud risk score or depending if limited-use account parameters are verified by CBP 480. Acquirer 474 then sends the authorization response message to the merchant computer and/or access device 460. The authorization response results may be displayed by access device 460, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by transaction processing network 484. A clearing process is a process of exchanging financial details between an acquirer and an issuer to facilitate posting to a customer's payment account and reconciliation of the user's settlement position.

Figure 5:
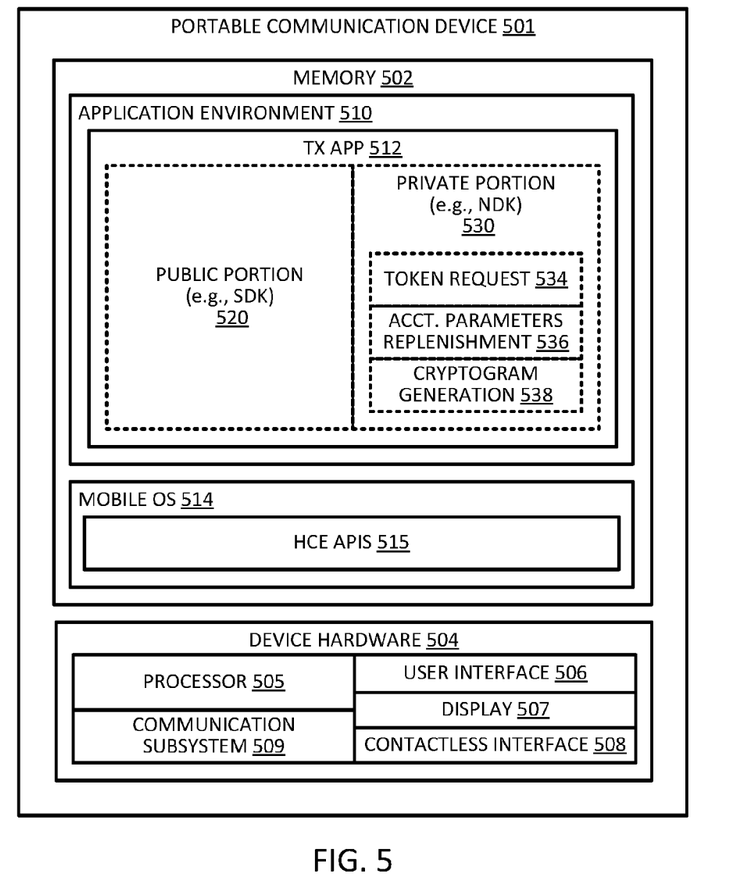
FIG. 5 illustrates a block diagram of a portable communication device, according to some embodiments.

FIG. 5 illustrates a block diagram of a portable communication device 501 (e.g., implementing portable communication device 410) in which some embodiments of the processes described herein can be implemented. Portable communication device 501 may include device hardware 504 coupled to a memory 502. Device hardware 504 may include a processor 505, a communications subsystem 509, use interface 506, a display screen 507 (which may be part of user interface 506), and a contactless interface 508. Processor 505 can be implemented as one or more integrated circuits (e.g., one or more single core or multicore microprocessors and/or microcontrollers), and is used to control the operation of portable communication device 501. Processor 505 can execute a variety of programs in response to program code or computer-readable code stored in memory 502, and can maintain multiple concurrently executing programs or processes. Communications subsystem 506 may include one or more RF transceivers and/or connectors that can be used by portable communication device 501 to communicate with other devices and/or to connect with external networks. User interface 506 can include any combination of input and output elements to allow a user to interact with and invoke the functionalities of portable communication device 501. In some embodiments, display screen 507 may be part of user interface 506.

Contactless interface 508 may include one or more RF transceivers to interact with a contactless reader of an access device to conduct a transaction (e.g., payment transaction, access transaction, information exchange, etc.). In some embodiments, contactless interface 608 can be accessed by the mobile OS 514 using card emulation APIs 516 without requiring the use of a secure element. In some embodiments, display 507 can also be part of contactless interface 508, and is used, for example, to perform transactions using QR codes, bar codes, etc.

Memory 502 can be implemented using any combination of any number of non-volatile memories (e.g., flash memory) and volatile memories (e.g., DRAM, SRAM), or any other non-transitory storage medium, or a combination thereof media. Memory 502 may store a mobile OS 514 and a mobile application environment 510 where one or more mobile applications reside including transaction application 512 (e.g., mobile wallet application, mobile banking application, mobile payments application, merchant application, etc.) to be executed by processor 505. In some embodiments, mobile OS 514 may implement a set of card emulation APIs 516 that can be invoked by transaction application 512 to access contactless interface 508 to interact with an access device.

According to some embodiments, transaction application 512 can include multiple software layers. For example, transaction application 512 may include public portion 520 (e.g., SDK) and private portion 530 (e.g., NDK). Public portion 520 may include a set of public APIs that is used to implement non-security sensitive functions such user interface functions, networking or communications functions, as well as functions that may invoke security-sensitive functions implemented in private portion 530. Public portion 520 can be written in a high level programming language such as Java. Private portion 630 may include a native library to implement security-sensitive functions such as token request function 534, account parameters replenishment function 536, cryptogram generation function 538, etc. Private portion 630 may be written in a low level programming language such as C or C++.

Token request function 534 can be invoked to request a token from a remote server (e.g., CBP, or issuer or host processing system). The token can be used as a substitute for a real account identifier to conduct transactions, for example, by sending the token to an access device. Using a token instead of a real account identifier can be more secure because the real account identifier is not transmitted when conducting a transaction. Token request function 534 can be invoked, for example, at enrollment time to request an initial token, or when the lifespan of the current token has expired.

Account parameters replenishment function 536 can be invoked to replenish or renew account parameters such as a limited-use key from a remote server (e.g., CBP, or issuer or host processing system). At the time of a transaction, the limited-use key is used to generate a transaction cryptogram that is provided to an access device to conduct the transaction. The limited-use key may be associated with a set or one or more limited-use thresholds (e.g., valid for a predetermined period of time, predetermined number of transactions, and/or predetermined cumulative transaction amount) to limit the usage of the LUK. When one or more of the limited-use thresholds of the LUK has expired or is about to expire, account parameters replenishment function 536 can be invoked to request a new LUK.

Cryptogram generation function 538 can be invoked at transaction time to generate a transaction cryptogram that is provided to an access device to conduct the transaction. The transaction cryptogram can be generated by receiving dynamic transaction data from the access device (e.g., transaction amount, transaction date, unpredictable number, etc.), and encrypting the dynamic transaction data with the LUK. In some embodiments, the transaction cryptogram can be generate by encrypting a static string instead with the LUK (e.g., if the access device does not support transmission of dynamic data to the portable communication device).

Figure 6:
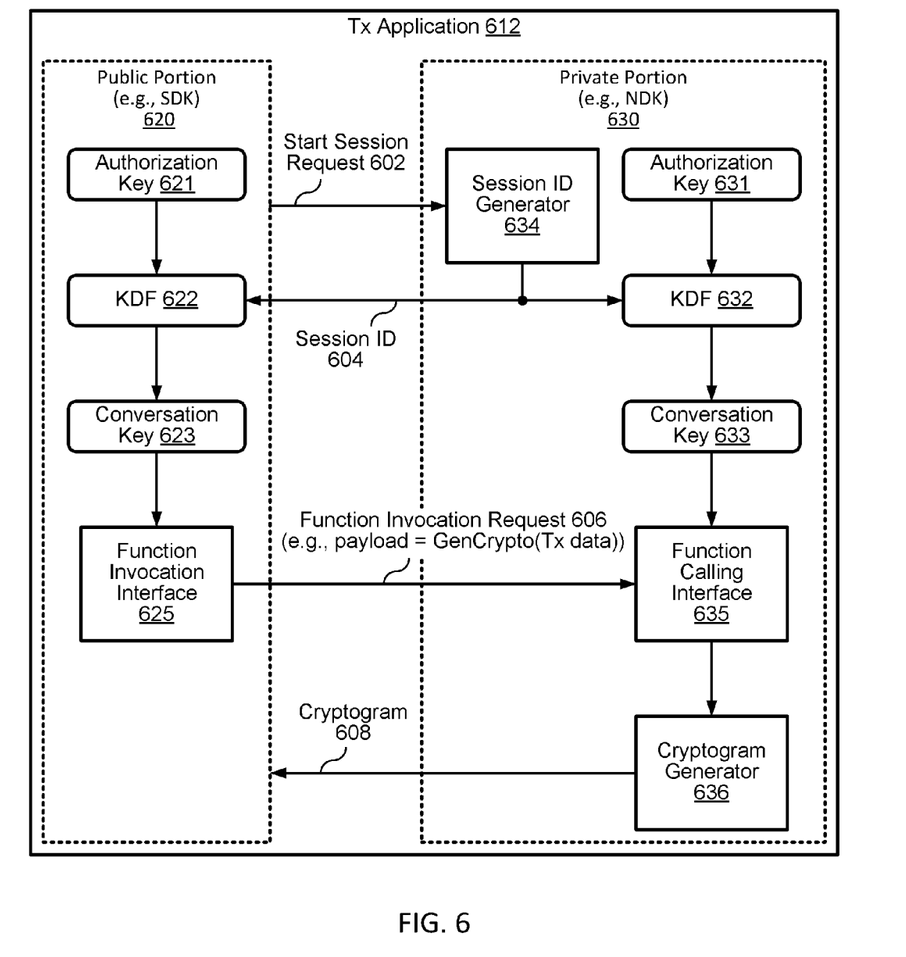
FIG. 6 illustrates a conceptual block diagram of a transaction application, according to some embodiments.

According to some embodiments, the security-sensitive functions implemented in private portion 530 can be protected from malicious code using the access control techniques described herein. FIG. 6 illustrates a block diagram of some components of a transaction application 612 (e.g., transaction application 512), according to some embodiments. The various functionalities of the various components including the request for a session ID and generation of the conversation keys are similar to those discussed with respect to FIG. 3, and hence a detailed description of which need not be repeated.

At build time, a unique encryption key is generated and shared between the public portion 620 and the private portion 630. This unique encryption key is embedded into public portion 620 as authorization key 621, and embedded into the private portion 630 as authorization key 631. The unique encryption key can be generated, for example, by the application provider of transaction application 612, CBP, or an issuer or host processing system.

When public portion 620 accesses private portion 630 (e.g., to invoke a token request function, account parameters replenishment function, or cryptogram generation function), public portion 620 sends a start session request 602 to session ID generator 634. For example, public portion 620 may send start session request 602 each time transaction application 612 is launched or started, each time transaction application 612 is selected or brought to the foreground of a user interface, each time transaction application 312 is used to invoke a token request function or account parameters replenishment function, and/or each time transition application 612 is used to conduct a transaction by invoking a cryptogram generation function. Session ID generator 634 generates a session ID 604 and responds to pubic portion 620 with session ID 604. Private portion 630 uses KDF 632 to combine authorization key 631 with the generated session ID 604 to derive conversation key 633. Upon receiving session ID 604, public portion 620 uses KDF 622 to combine authorization key 621 with the generated session ID 604 to derive conversation key 623. Conversation keys 623 and 633 can be symmetric keys.

To invoke a function implemented in private portion 630, public portion 620 encrypts the function call and its associated parameters using the conversation key 623, and packages the encrypted information as the payload of a function invocation request 606. For example, as illustrates function invocation interface 625 of public portion 620 may invoke a cryptogram generation function implemented in private portion 630 to generate a transaction cryptogram to conduct a transaction. Function invocation interface 625 of public portion 620 may encrypt the function call "Gen-Crypto" and dynamic transaction data received from an access device as the function call's parameters to generate an encrypted payload, and send function invocation request 606 with the encrypted payload to private portion 630.

When private portion 630 receives function invocation request 606, function calling interface 635 of private portion 630 decrypts the payload of function invocation request 606 using conversation key 633 to retrieve the function call and its associated parameters. If the function call was properly encrypted using a valid conversation key 623, function calling interface 625 can recognize the function call as a cryptogram generation function call. Private portion 630 then provides the function call's parameters (e.g., dynamic transaction data) to cryptogram generator 636, which then executes the cryptogram generation function to encrypt the dynamic transaction data using a LUK to generate a transaction cryptogram 608. The generated transaction cryptogram 608 is then sent back to public portion 620, and public portion 620 may then provide transaction cryptogram 608 to an access device (e.g., via a contactless interface) to conduct the transaction. In some embodiments, transaction cryptogram 608 can be encrypted by private portion 630 using conversation key 633 before being sent to public portion 620, and public portion 620 may decrypt transaction cryptogram 608 using conversation key 623 before providing it to the access device. In some embodiments, public portion 620 may not have direct access to a token, and the token can be retrieved from private portion 630 by public portion 620 using similar techniques. The retrieved token and transaction cryptogram can be provided to the access device by public portion 620 to conduct the transaction. Other security-sensitive functions implemented in private portion 630 (e.g., token request function, account parameters replenishment function) can be invoked by public portion 620 using similar techniques.

Figure 7:
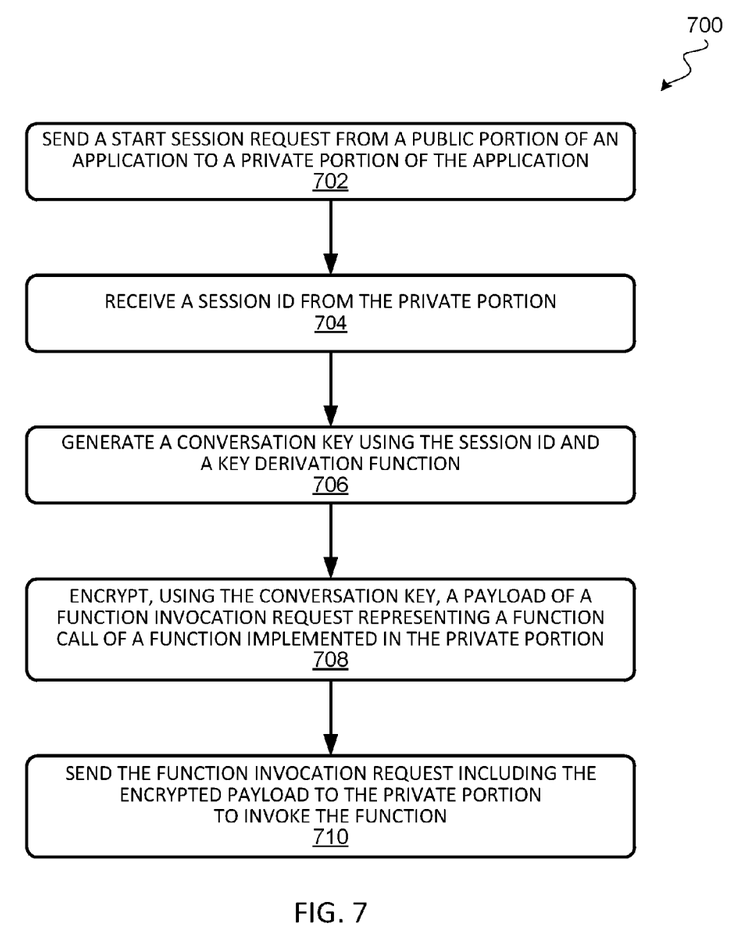
FIG. 7 illustrate a flow diagram of a process for controlling access in an application having a public portion and a private portion, according to some embodiments.

FIG. 7 illustrates a flow diagram of a process 700 for controlling access in an application having a public portion and a private portion, according to some embodiments. Process 700 can be performed by a pubic portion of the application for invoking a function implemented in the private portion of the same application. In some embodiments, the public portion can be written in a first programming language, and the private portion can be written in a second programming language that is different than the first programming language. At block 702, the public portion sends a start session request to a private portion within the same application to establish a session with the private portion. The start session request can be sent, for example, each time the application is launched, or each time the application is used to initiate a transaction, etc. At block 704, the public portion receives a session ID from the private portion. At block 706, the public portion generates a conversation key using the session ID and a key derivation function. For example, the public portion may combine the session ID with an authorization key using a key derivation function to generate the conversation key. The authorization key can be a shared secret between the public portion and the private portion. At block 708, the public portion encrypts a payload representing a function call of a function implemented in the private portion that is being invoked by the public portion and any associated parameters. At block 710, the public portion sends a function invocation request that includes the encrypted payload to the private portion to invoke the function. The function being invoked and implemented in the private portion can be, for example, one of a token request function, an account parameter replenishment function, and a cryptogram generation function.

Figure 8:
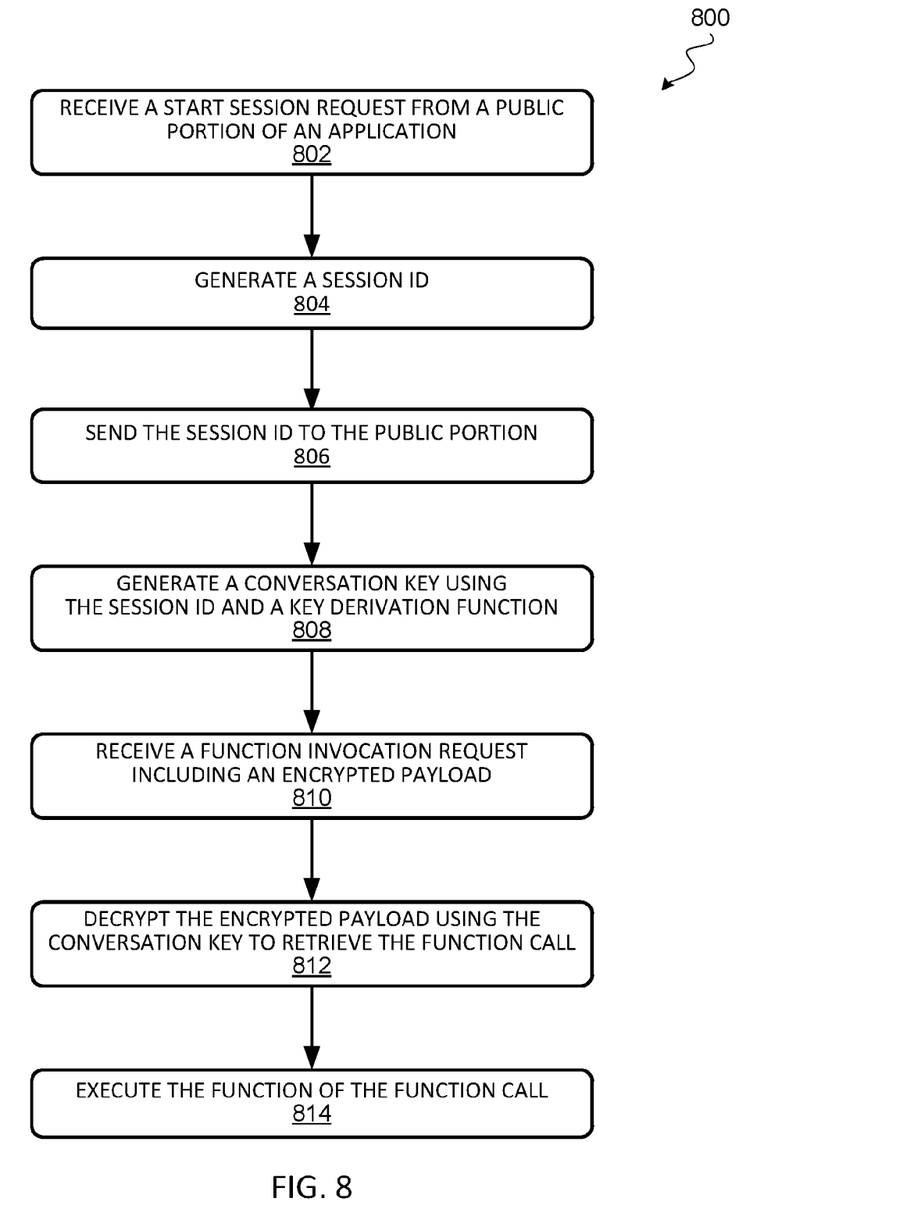
FIG. 8 illustrates another flow diagram of a process for controlling access in an application having a public portion and a private portion, according to some embodiments.

FIG. 8 illustrates a flow diagram of a process 800 for controlling access in an application having a public portion and a private portion, according to some embodiments. Process 800 can be performed by the private portion of the application for controlling access to a function implemented in the private portion of the application. At block 802, the private portion of an application receives a start session request from a public portion of the same application. The start session request can be received, for example, each time the application is launched, or each time the application is used to initiate a transaction, etc. At block 804, the private portion generate a session ID. At block 806, the private portion sends the generated session ID to the public portion. At block 808, the private portion generates a conversation key using the session ID and a key derivation function. For example, the private portion may combine the session ID with an authorization key using a key derivation function to generate the conversation key. The authorization key can be a shared secret between the public portion and the private portion. At block 810, the private portion receives a function invocation request including an encrypted payload representing a function call of a function implemented in the private portion and any associated parameters. At block 812, the private portion decrypts the encrypted payload using the conversation key to retrieve the function call. At block 814, the private portion executes the function of the function call. The function being executed and implemented in the private portion can be, for example, one of a token request function, an account parameter replenishment function, and a cryptogram generation function. In some embodiments, the private portion may ignore any communication or request from the public portion that is not a start session request and not a function invocation request. In some embodiments, the public portion can be written in a first programming language, and the private portion can be written in a second programming language that is different than the first programming language.

Although the description above may have descried the access control techniques for use in an application having a private portion and a public portion, it should be understood that the techniques can be used to protect functions implemented in any software layer of an application. Furthermore, the application is not restricted to have only two software layers and can have any number of software layers (e.g., three or more software layers, portions, or libraries).

Any of the computing devices, communication devices, computers, servers, and the like described herein can be implemented using one or more processors coupled to a memory that store code or instructions, which when executed by the one or more processors, cause the device to perform one or more of the methods and processes described herein. Memory, storage media, and computer-readable media for containing code, or portions of code described herein, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the various embodiments may become apparent to those skilled in the art upon review of the disclosure. The scope of the invention may, therefore, be determined not with reference to the above description, but instead may be determined with reference to the pending claims along with their full scope or equivalents.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

It may be understood that some embodiments as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A portable communication device comprising: one or more processors; and
   a memory coupled to the one or more processors and storing computer readable code, which when executed by the one or more processors, implements a software application having a function invoking software layer and a target software layer integrated within the same software application:
   wherein the function invoking software layer is configured to: send a start session request to the target software layer; receive a session identifier (ID) from the target software layer;
   generate a conversation key using the session ID and a key derivation function, wherein the conversation key is further generated based on an authorization key that is shared between the function invoking software layer and the target software layer;
   encrypt a payload of a function invocation request using the conversation key, the payload containing a function call of a cryptogram generation function implemented in the target software layer; and
   send the function invocation request including the encrypted payload to the target software layer; and
   wherein the target software layer is configured to:
   execute the cryptogram generation function being called in the function invocation request.

2. The portable communication device of claim 1, wherein the target software layer is further configured to:
   generate the session ID in response to receiving the start session request from the function invoking software layer.

3. The portable communication device of claim 2, wherein the target software layer is further configured to:
   generate the conversation key using the session ID and the key derivation function; and
   decrypt the encrypted payload using the conversation key to retrieve the function call.

4. The portable communication device of claim 1, wherein the function invoking software layer is configured to send the start session request to the target software layer each time the software application is launched.

5. The portable communication device of claim 1, wherein the function invoking software layer is configured to send the start session request to the target software layer each time the software application is used to initiate a transaction.

6. The portable communication device of claim 1, wherein the target software layer is further configured to execute one of a token request function, or an account parameter replenishment request function.

7. The portable communication device of claim 1, wherein the target software layer is configured to ignore any request from the function invoking software layer that is not either a start session request or a function invocation request.

8. The portable communication device of claim 1, wherein the function invoking software layer is written in a first programming language, and the target software layer is written in a second programming language that is different than the first programming language.

9. A method of controlling access in a software application having a function invoking software layer and a target software layer integrated within the same software application, the method comprising:
   sending, by the function invoking software layer of the software application, a start session request to the target software layer of the same software application:
   receiving, by the function invoking software layer, a session identifier (ID) from the target software layer;
   generating, by the function invoking software layer, a conversation key using the session ID and a key derivation function, wherein the conversation key is further generated based on an authorization key that is shared between the function invoking software layer and the target software layer;
   encrypting, by the function invoking software layer, a payload of a function invocation request using the conversation key, the payload containing a function call of a cryptogram generation function implemented in the target software layer;
   sending, by the function invoking software layer, the function invocation request including the encrypted payload to the target software layer to invoke the cryptogram generation function.

10. The method of claim 9, wherein the start session request is sent each time the software application is launched.

11. The method of claim 9, wherein the start session request is sent each time the software application is used to initiate a transaction.

12. The method of claim 9, wherein the target software layer further implements one of a token request function, or an account parameter replenishment request function.

13. A method of controlling access in a software application having a function invoking software layer and a target software layer integrated within the same software application, the method comprising:
- receiving, by the target software layer of the software application, a start session request from the function invoking software layer of the same software application;
- generating, by the target software layer, a session ID in response to the start session request;
- sending, by the target software layer, the session ID to the function invoking software layer;
- generating, by the target software layer, a conversation key using the session ID and a key derivation function, wherein the conversation key is further generated based on an authorization key that is shared between the function invoking software layer and the target software layer;
- receiving, by the target software layer, a function invocation request including an encrypted payload containing a function call of a cryptogram generation function implemented in the target software layer;
- decrypting, by the target software layer, the encrypted payload using the conversation key to retrieve the function call; and
- executing, by the target software layer, the cryptogram generation function of the function call.

14. The method of claim 13, wherein the start session request is received each time the software application is launched.

15. The method of claim 13, wherein the start session request is received each time the software application is used to initiate a transaction.

16. The method of claim 13, wherein the target software layer further implements one of a token request function, or an account parameter replenishment request function.

17. The method of claim 13, wherein the target software layer ignores any request from the function invoking software layer that is not either a start session request or a function invocation request.

\* \* \* \* \*